US007017165B2

(12) United States Patent
Chen

(10) Patent No.: US 7,017,165 B2
(45) Date of Patent: Mar. 21, 2006

(54) DISK DRIVE WITH EJECTING FUNCTION

(75) Inventor: Wen-Tsan Chen, Yunlin (TW)

(73) Assignee: BenQ Corporation, Taoyuan (TW)

(*) Notice: Subject to any disclaimer, the term of this patent is extended or adjusted under 35 U.S.C. 154(b) by 292 days.

(21) Appl. No.: 10/705,937

(22) Filed: Nov. 13, 2003

(65) Prior Publication Data

US 2004/0098734 A1 May 20, 2004

(30) Foreign Application Priority Data

Nov. 18, 2002 (TW) .............................. 91218502 U

(51) Int. Cl.
*G11B 17/03* (2006.01)

(52) U.S. Cl. ...................................................... 720/607

(58) Field of Classification Search ............... 369/77.1, 369/77.2, 247, 263; 720/607
See application file for complete search history.

(56) References Cited

U.S. PATENT DOCUMENTS 5,995,468 A * 11/1999 Furukawa ................... 720/607
6,002,658 A * 12/1999 Aso et al. ................... 720/651
6,044,057 A * 3/2000 Park et al. .................. 720/675
6,212,147 B1 * 4/2001 Ishihara ...................... 720/612
9,092,328 * 11/2001 Omori ....................... 369/75.2
6,437,938 B1 * 8/2002 Wada .......................... 360/95
6,654,334 B1 * 11/2003 Yamashita et al. .......... 720/641

* cited by examiner

*Primary Examiner*—William Korzuch
*Assistant Examiner*—Matthew Kayrish
(74) *Attorney, Agent, or Firm*—Michael Bednarek; Pillsbury Winthrop Shaw Pittman LLP

(57) ABSTRACT

The present invention discloses a disk drive with ejecting function. The disk drive has a tray that is selectively received in a housing. The tray has a track with a first end and a second end. A chassis is located inside the housing, and a cam rack is slidably disposed on the chassis. A first shaft and a second shaft are disposed on the chassis, and the first shaft engages with the track. A curved bar is slidably disposed on the chassis and touches against the second shaft. When the curved bar is actuated in a direction parallel to the moving direction of the tray, the curved bar pushes the second shaft to move in a direction perpendicular to the moving direction of the tray. Afterwards, the first shaft moves from the first end to the second end, and the tray is ejected.

6 Claims, 6 Drawing Sheets

DISK DRIVE WITH EJECTING FUNCTION

CROSS REFERENCE TO RELATED APPLICATIONS

This application claims priority of Taiwan Patent Application Serial No. 091218502 filed on Nov. 18, 2002.

FIELD OF INVENTION

The present invention relates to a disk ejection apparatus of a disk drive.

BACKGROUND OF THE INVENTION

A disk drive is indispensable among computer peripherals nowadays. Conventionally, the disk is held by a tray inside the disk drive to perform data reading and writing operations. To take out or replace the disk, users can eject the tray by pressing the button on the panel.

Normally, the ejection of the tray could be controlled through the button on the panel. However, when a system breakdown or a power failure occurs, users will need to eject the tray manually. Therefore, a reliable method for manual ejection is necessary for a disk drive.

SUMMARY OF THE INVENTION

The main aspect of the present invention provides a disk ejection apparatus of a disk drive.

The present invention provides a disk drive with ejecting function. The disk drive has a housing in which a tray is selectively received. The tray includes a track that has a first end and a second end. A cam rack is slidably disposed on a chassis, and the chassis is placed inside the housing. Disposed on the cam rack, a first shaft engages with the track. A second shaft is also disposed on the cam rack. A curved bar, slidably disposed on the chassis, touches against the second shaft. When actuated in a direction parallel to the moving direction of the tray, the curved bar drives the second shaft in order to make the cam rack move in a direction perpendicular to the moving direction of the tray. Then the first shaft moves from the first end of the track to the second end, and the tray is ejected from the housing accordingly.

In the above-mentioned embodiment, a block with an angled surface can replace the curved bar. The block is movably disposed on the chassis, and the angled surface of the block touches against the second shaft. An angle less than 90 degrees is formed between the angled surface and the moving direction of the tray. When actuated in a direction parallel to the moving direction of the tray, the block drives the second bar in order to make the cam rack move in a direction perpendicular to the moving direction of the tray. Then the first shaft moves from the first end of the track to the second end, and the tray is ejected from the housing accordingly.

DETAILED DESCRIPTION

The present invention provides a disk ejection apparatus of a disk drive. When a system breakdown or a power failure occurs, the tray could be manually ejected.

Figure 1:
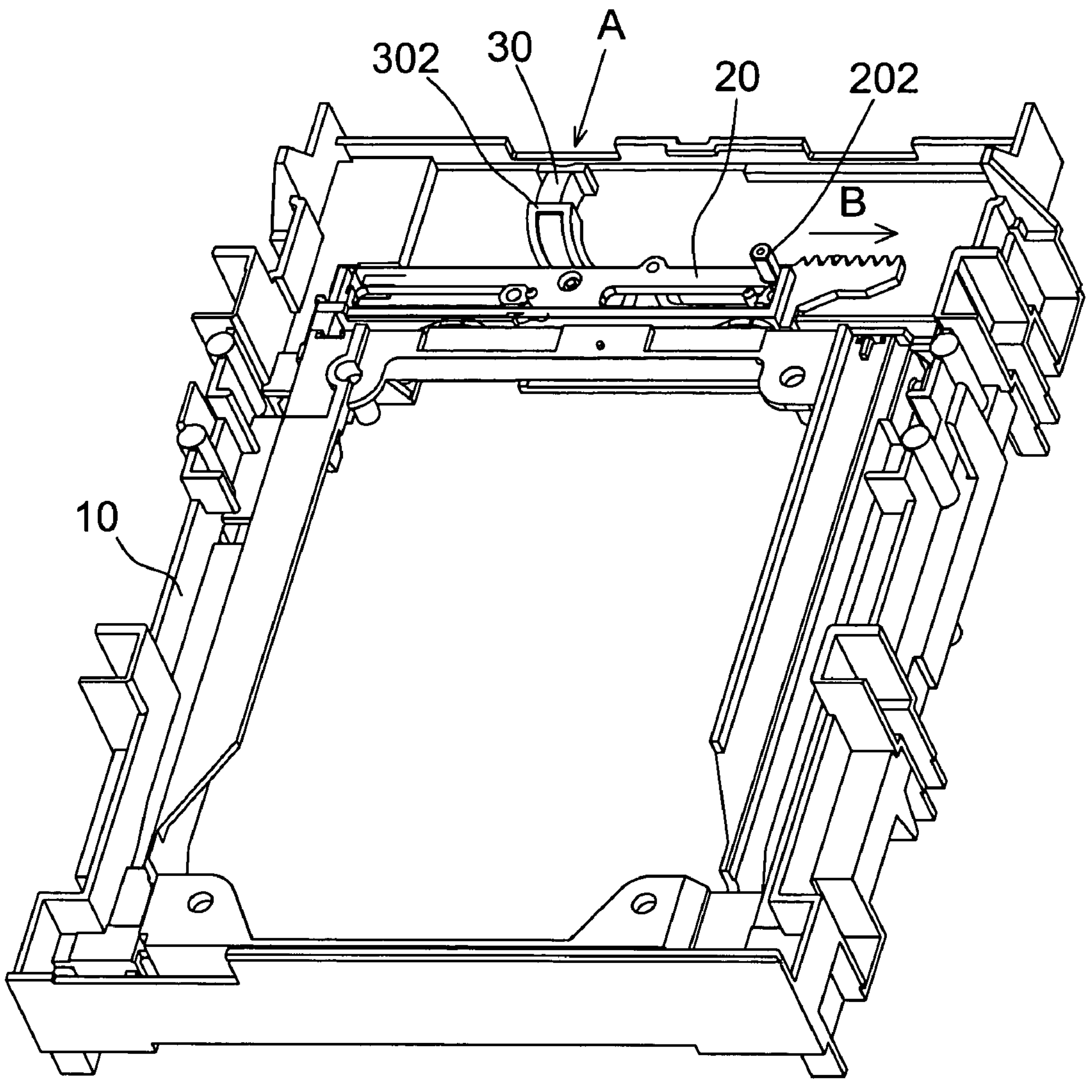
FIG. 1 is a schematic diagram of a chassis disposed inside a disk drive according to an embodiment of the present invention.

FIG. 1 is a schematic diagram of a chassis 10 disposed inside a disk drive according to an embodiment of the present invention. The chassis 10 is disposed inside the housing of the disk drive while a cam rack 20 is slidably disposed on the chassis 10. Besides, a first shaft 202 is disposed on the cam rack 20. Also, a curved bar 30 is slidably disposed on the chassis 10, and a base 302 restricts the movement of the curved bar 30.

Figure 2:
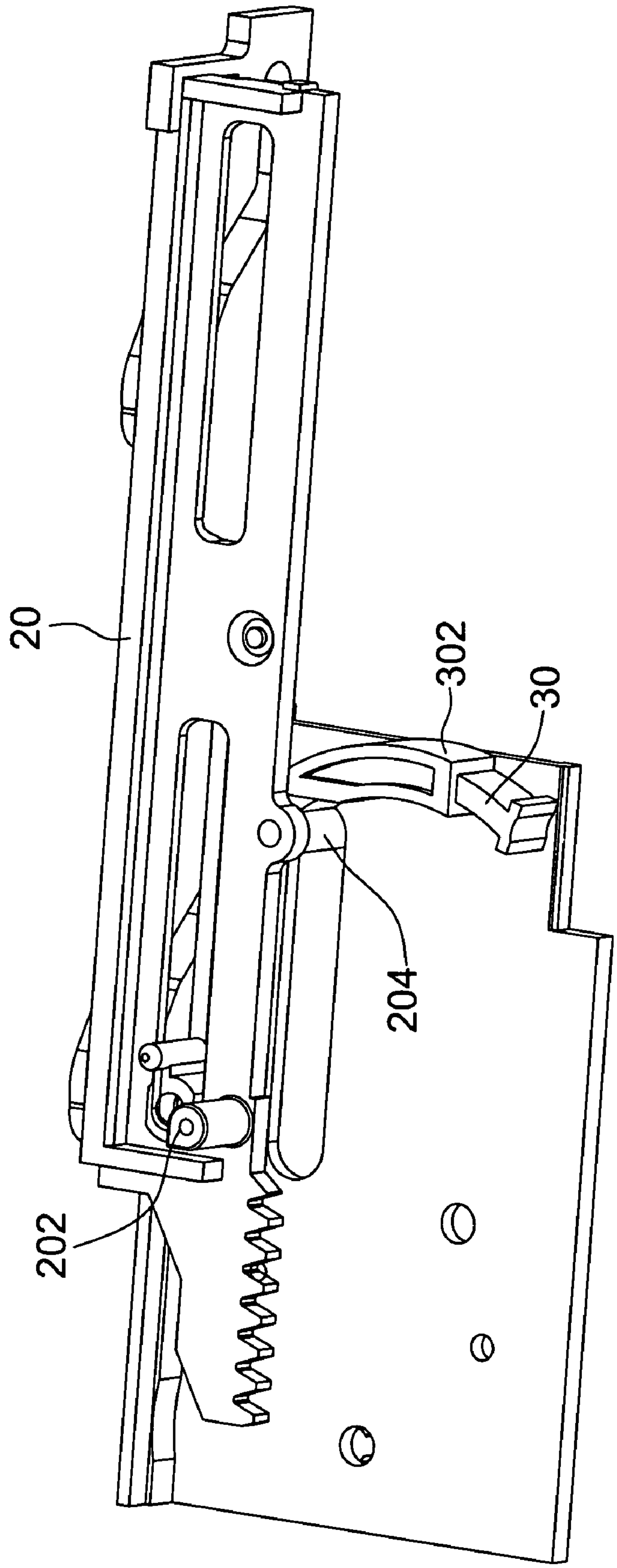
FIG. 2 is a schematic diagram of a disk ejection apparatus according to an embodiment of the present invention.
Figure 3:
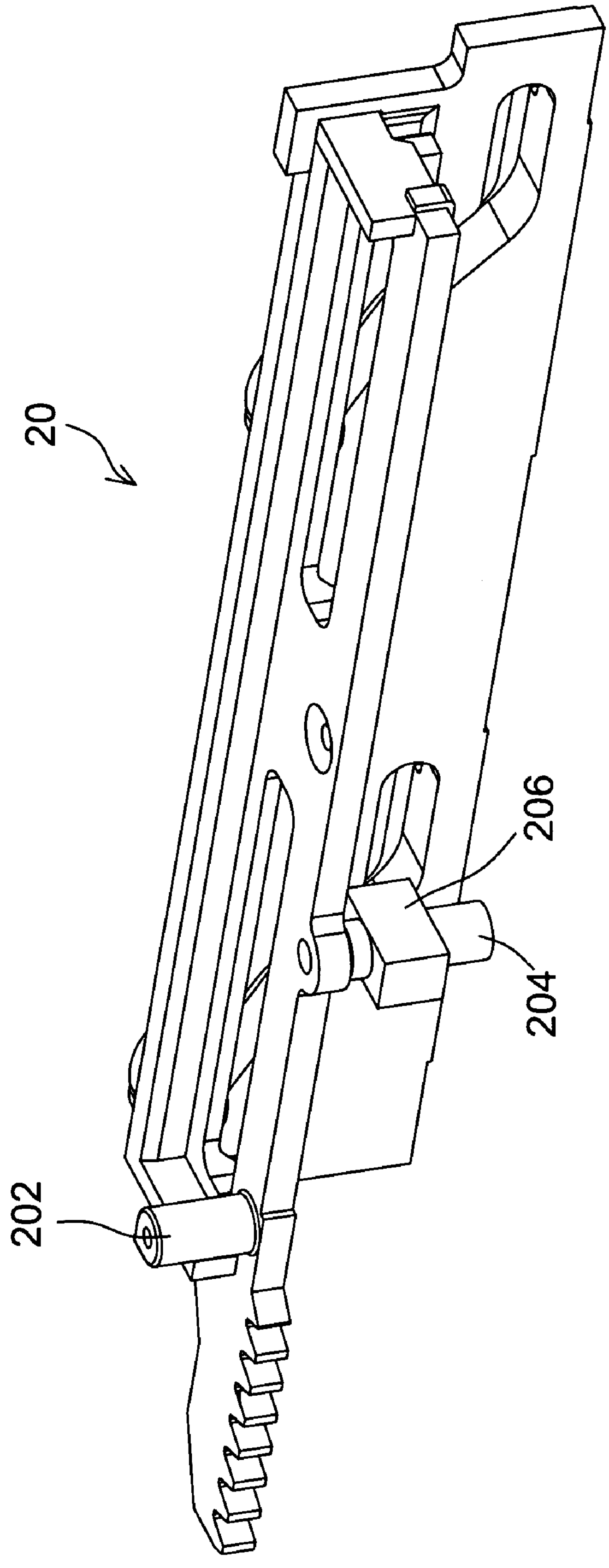
FIG. 3 is a schematic diagram of a cam rack according to an embodiment of the present invention.

FIG. 2 is a schematic diagram illustrating the relative positions of the curved bar 30 and the cam rack 20. A second shaft 204 is disposed on the cam rack 20 and touches against the curved bar 30. When actuated, the curved bar 30 drives the second shaft 204 and then makes the cam rack 20 move accordingly. FIG. 3 shows another embodiment of the second shaft 204. The second shaft 204 has a cuboid 206 thereon. When actuated, the curved bar 30 drives the cuboid 206 and makes both the second shaft 204 and the cam rack 20 move accordingly.

Figure 4:
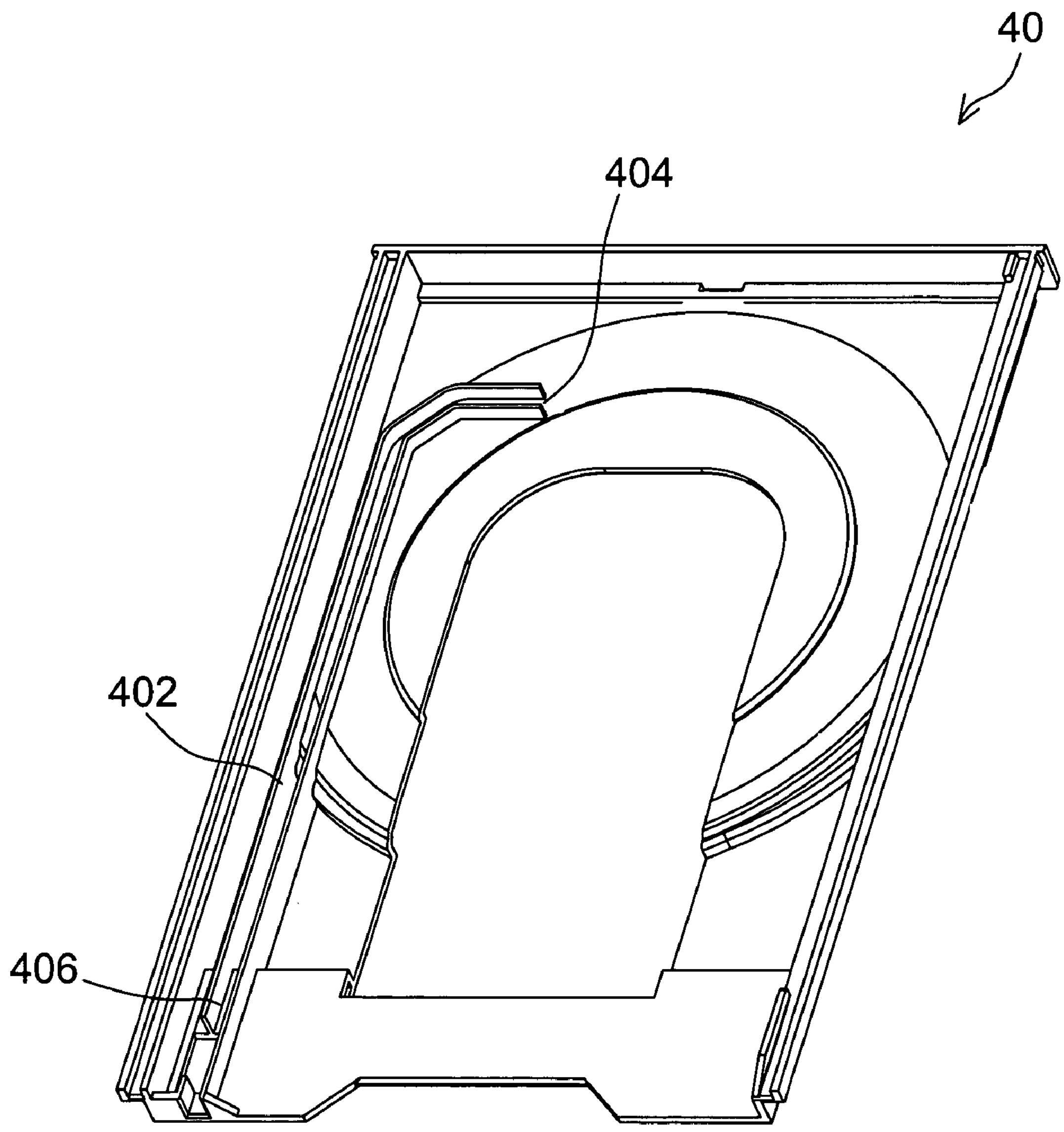
FIG. 4 is a back-side view of a tray of the present invention.

FIG. 4 is a backside view of a tray 40 of the present invention. Disposed on the backside of the tray 40, the track 402 has a first end 404 and a second end 406. When the tray 40 is received in the disk drive, the track 402 engages with the first shaft 202 of FIG. 1. Furthermore, when the tray 40 is located inside the disk drive, the cam rack 20 is at the position as shown in FIG. 1. Meanwhile, the first shaft 202 engages with the track 402 at the first end 404. When the button on the panel is pressed, the first shaft 202 moves from the first end 404 to the second end 406, and thus the tray 40 is ejected from the disk drive. The above-mentioned method of ejecting through pressing the button is well known to those skilled in the art so that further details are not discussed hereinafter.

Referring to FIG. 1, FIG. 2 and FIG. 4, the following are the steps of the manual disk ejection. First, the curved bar 30 is actuated in a direction parallel to the moving direction of the tray 40, that is, the direction of arrow A. The curved bar 30 could be actuated by a push of a stick. Secondly, the curved bar 30 drives the second shaft 204, causing the cam rack 20 move in a direction perpendicular to the moving direction of the tray 40, said that is, the direction of arrow B. Thereafter, the first shaft 202, which engages with the track 402, is driven by the movement of the cam rack 20 and moves in the direction of arrow B. At last, when the first shaft 202 moves from the first end 404 to the second end 406, the tray 40 is ejected from the disk drive accordingly.

Figure 5:
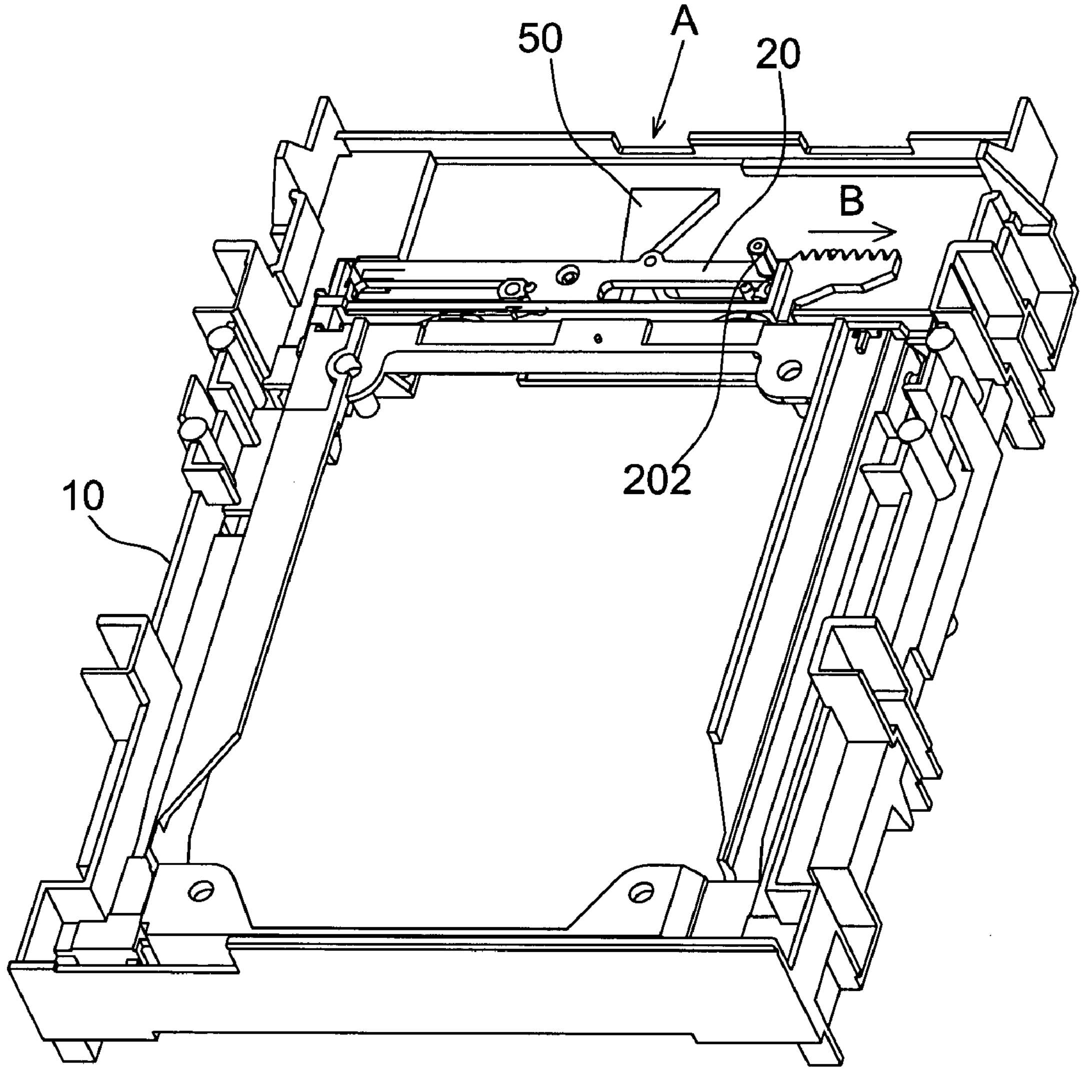
FIG. 5 is a schematic diagram of a chassis disposed inside a disk drive according to another embodiment of the present invention.
Figure 6:
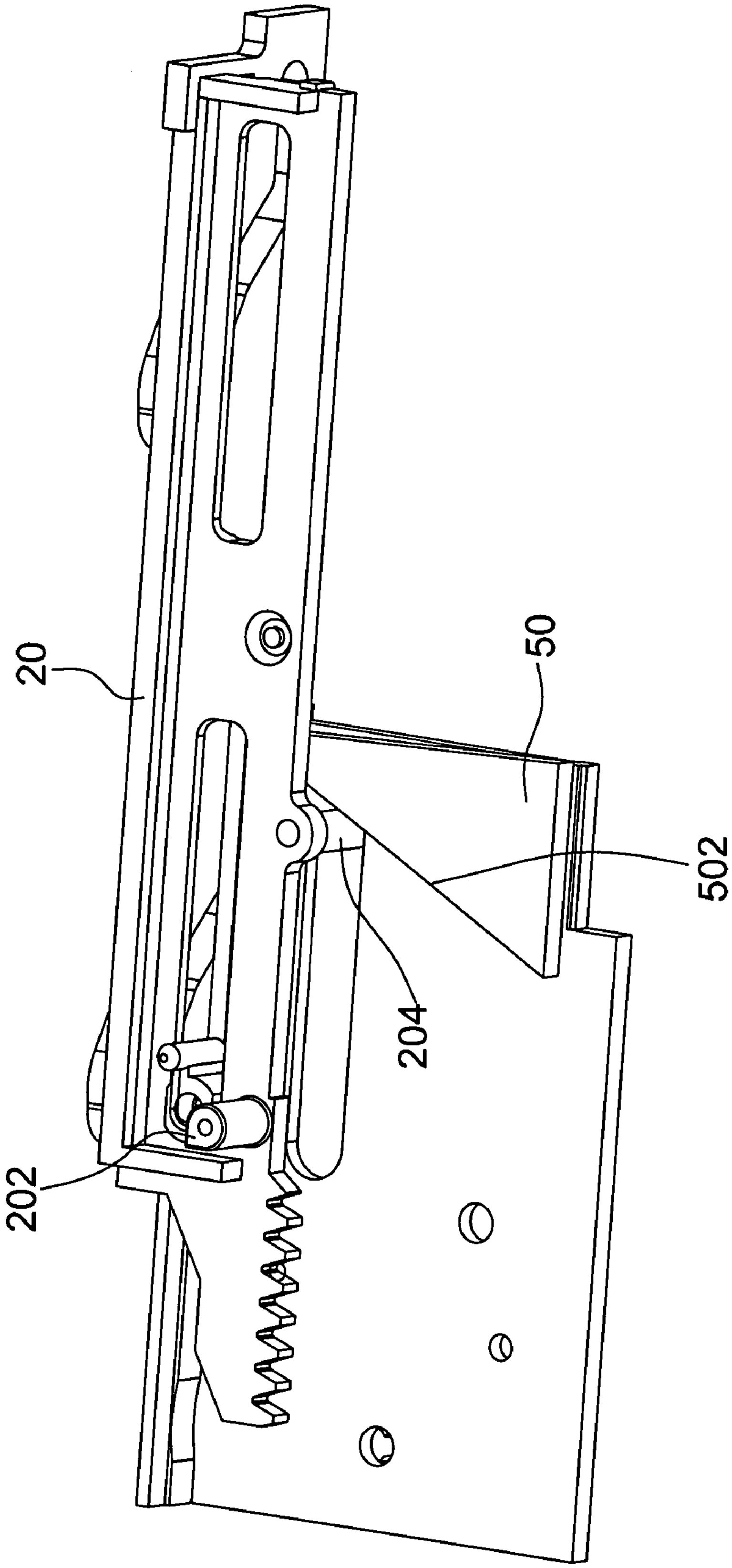
FIG. 6 is a schematic diagram of a disk ejection apparatus according to another embodiment of the present invention.

FIG. 5 is a schematic diagram of a chassis 10 disposed inside a disk drive according to another embodiment of the present invention. The chassis 10 of FIG. 5 resembles the chassis 10 of FIG. 1 while a block 50 of FIG. 5 replaces the curved bar 30 of FIG. 1. Disposed on the chassis 10, the block 50 has an angled surface 502 touching against the second shaft 204, as shown in FIG. 6. The block 50 includes the angled surface 502 to push against the second shaft 204 as shown in FIG. 6.

Referring to FIG. 4, FIG. 5 and FIG. 6, the following are the steps of the manual disk ejection. First, the block 50 is actuated in a direction parallel to the moving direction of the tray 40, that is, the direction of arrow A. Secondly, the block 50 drives the second shaft 204, causing the cam rack 20 move in a direction perpendicular to the moving direction of the tray 40, said that is, the direction of arrow B. Thereafter, the first shaft 202, which engages with the track 402, is driven by the movement of the cam rack 20 and moves in the direction of arrow B. Lastly, when the first shaft 202 moves from the first end 404 to the second end 406, the tray 40 is ejected from the disk drive accordingly.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

What is claimed is:

1. A disk drive with ejecting function comprising:

a housing;

a tray selectively received inside said housing, said tray including a track having a first end and a second end;

a chassis disposed inside said housing;

a cam rack slidably disposed on said chassis;

a first shaft disposed on said cam rack and engaging with said track, said first shaft moving from said first end of said track to said second end when said tray is ejected from said housing;

a second shaft disposed on said cam rack; and a curved bar slidably disposed on said chassis, said curved bar touching against said second shaft;

wherein, when said curved bar is actuated in a direction parallel to a moving direction of said tray, said curved bar drives said second shaft in order to make said cam rack move in a direction perpendicular to said moving direction of said tray, said first shaft moves from said first end of said track to said second end, and said tray is ejected from said housing.

2. The disk drive of claim 1, further comprising a base for restricting a movement of said curved bar.

3. The disk drive of claim 1, wherein said second shaft is a cuboid, and said curved bar touches against a surface of said cuboid.

4. A disk drive with ejecting function comprising:

a housing;

a tray selectively received inside said housing, said tray including a track having a first end and a second end;

a chassis disposed inside said housing;

a cam rack slidably disposed on said chassis;

a first shaft disposed on said cam rack and engaging with said track, said first shaft moving from said first end of said track to said second end when said tray is ejected from said housing;

a second shaft disposed on said cam rack; and a block slidably disposed on said chassis, a surface of said block touching against said second shaft, an angle forming between said surface and a moving direction of said tray being less than 90 degrees;

wherein, when said block is actuated in a direction parallel to said moving direction of said tray, said block pushes said second shaft in order to make said cam rack move in a direction perpendicular to said moving direction of said tray, said first shaft moves from said first end of said track to said second end, and said tray is ejected from said housing.

5. The disk drive of claim 4, wherein said block is a triangular block.

6. The disk drive of claim 4, wherein said second shaft is a cuboid, and an angled surface of said block touches against a surface of said cuboid.

* * * * *